United States Patent [19]

Beier

[11] 4,348,696

[45] Sep. 7, 1982

[54] TELEVISION VIEWING CONTROL DEVICE

[76] Inventor: Galen C. Beier, 1200 Kaplan St., Waterloo, Iowa 50702

[21] Appl. No.: 185,226

[22] Filed: Sep. 8, 1980

[51] Int. Cl.³ .............................................. H04N 5/44

[52] U.S. Cl. ...................................... 358/188; 358/93; 358/114; 358/115; 455/181; 340/825.31

[58] Field of Search ................. 358/188, 93, 114, 115; 455/181; 340/149 R, 149 A

[56] References Cited

U.S. PATENT DOCUMENTS 4,081,754 3/1978 Jackson .............................. 455/181

4,268,817 5/1981 Simjian ........................... 340/149 A

*Primary Examiner*—Richard Murray

*Attorney, Agent, or Firm*—G. Brian Pingel

[57] ABSTRACT

A television viewing control device for recording the viewing time of one or more viewers watching a controlled television set and turning the television set off when a predetermined viewing time limit of any one of the viewers is exceeded. The viewing control device includes a random access memory circuit for semi-permanently storing an assigned individual password for each of a given number of viewers and a predetermined viewing time associated with each of the passwords, a micro processor unit having the capacity for temporarily storing the individual password of each of the viewers watching the controlled set at any particular instance of time, and including polling means operated by a read only memory unit at predetermined intervals of time to compare the passwords in the random access memory and the micro processor unit and to subtract a period of time equal to the predetermined interval from the viewing time associated with each of the passwords in the micro processor unit, and a control switch actuated by the micro processor unit for turning the controlled television set on when a first password is fed into the memory of the micro processor unit and to turn the set off when the time limit of any of the viewers watching the controlled set reaches zero.

7 Claims, 5 Drawing Figures

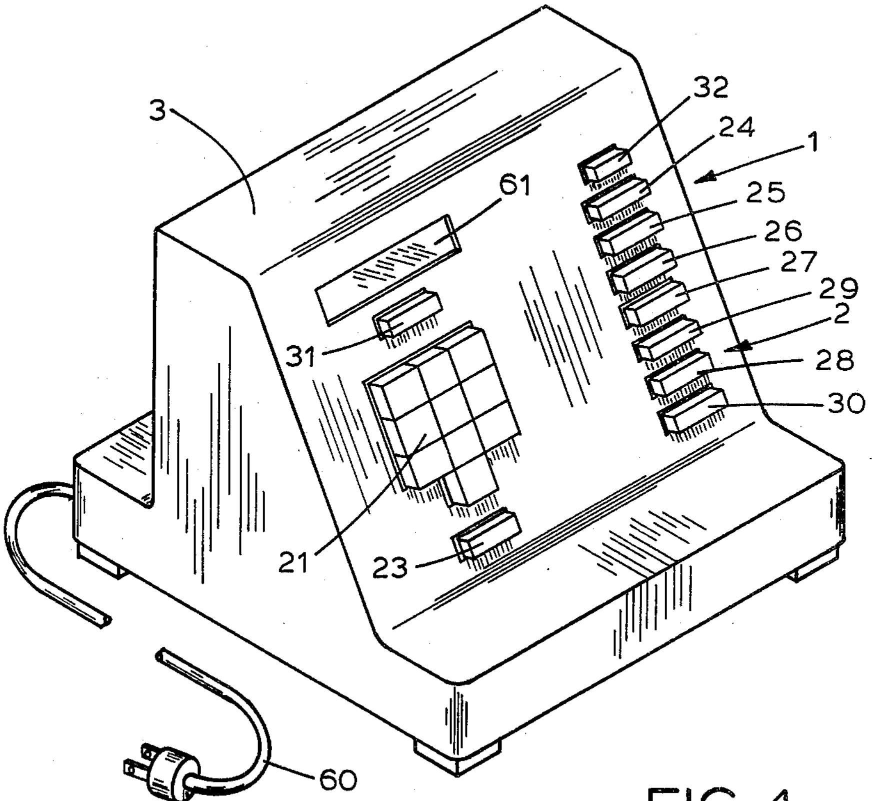
FIG.1
FIG.4
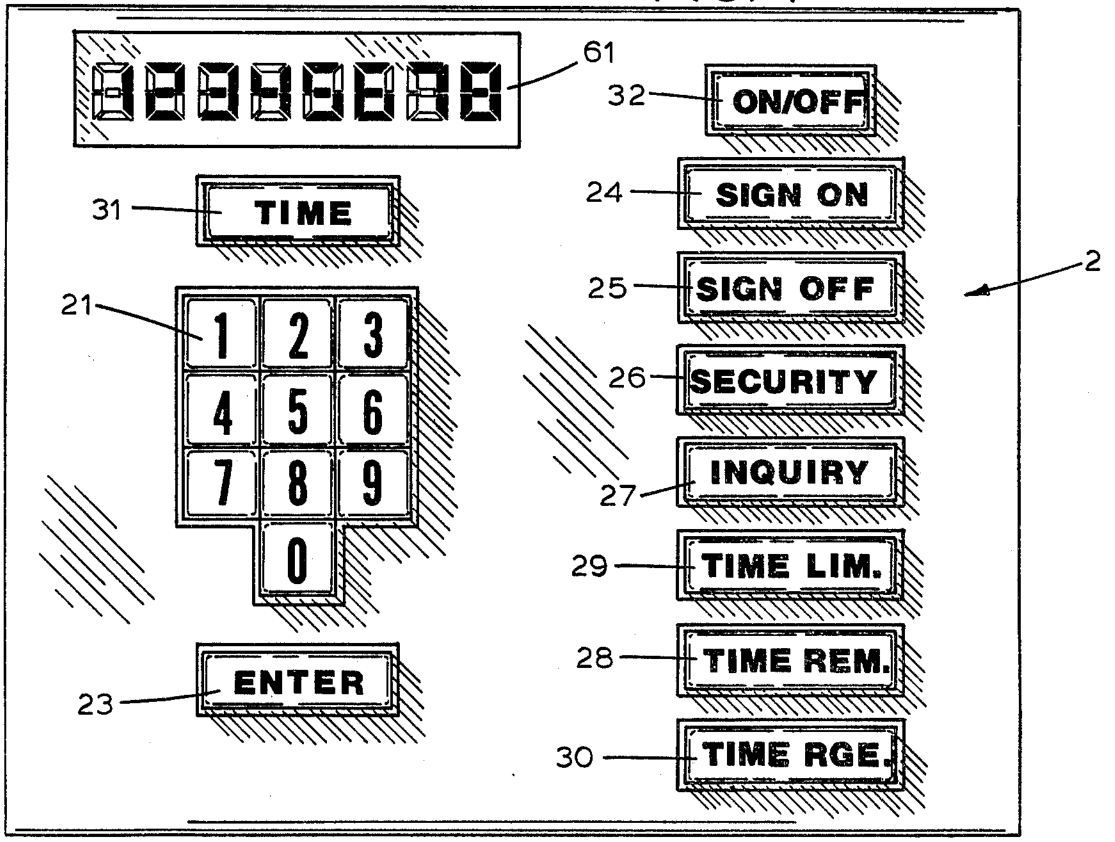

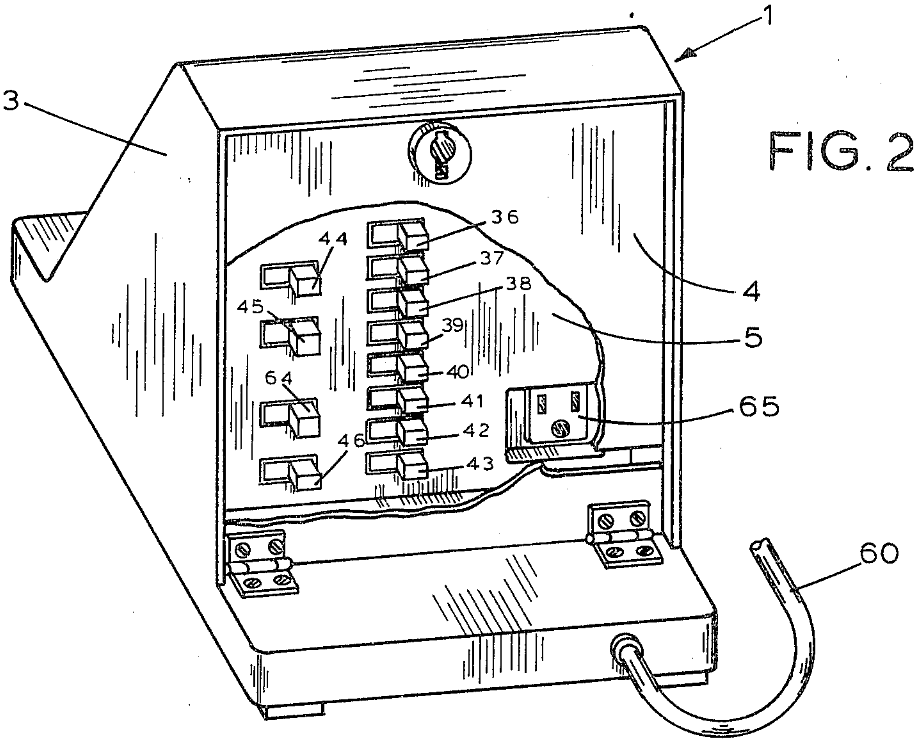
FIG. 2
FIG. 5
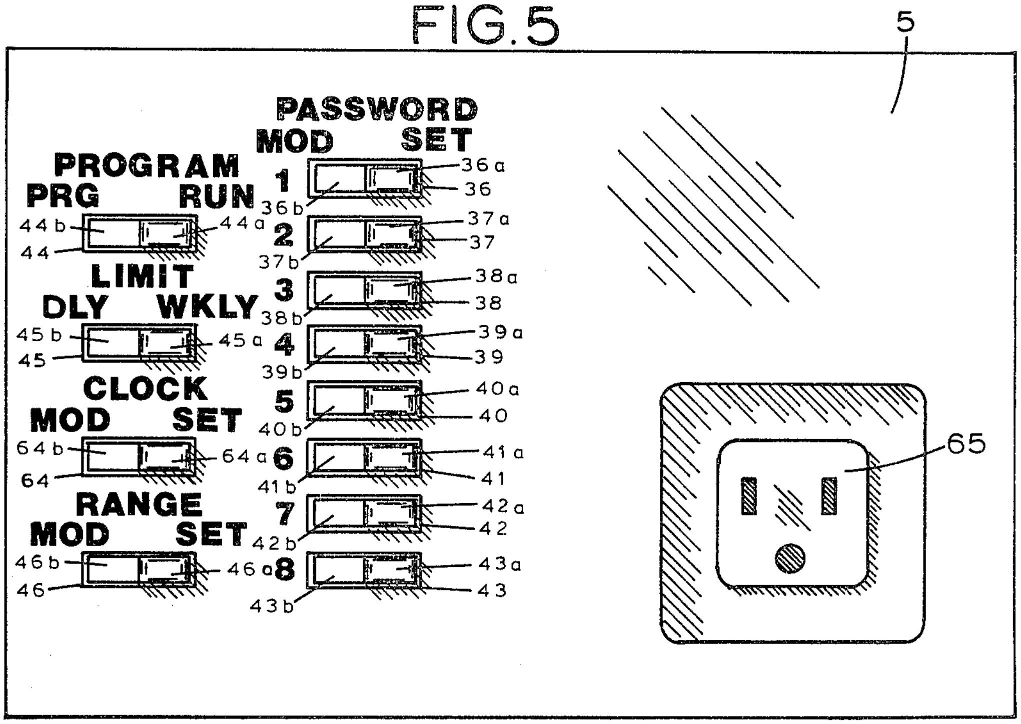

TELEVISION VIEWING CONTROL DEVICE

BACKGROUND OF THE INVENTION

1. Field of the Invention

The present invention relates in general to control devices for automatically turning a television set on or off and more specifically to a control device that limits the daily or weekly viewing time of several viewers to a predetermined period of time.

2. Description of the Prior Art

Recent studies appear to indicate children of the 1970's are not as well educated as the children of the preceding decade. Many educational administrators and child psychologists have placed the blame for the reduced educational levels on the substantial amount of television viewing time of today's children.

In the past, there has been no satisfactory means for selectively controlling the viewing time of children if a parent or guardian is not present to direct their activity. It is known that in some instances, parents have resorted to disabling their television sets by removing one of its components when it is known they will not be home to supervise their children. Also, a device has been produced that can be used with a standard television set and provides a locking switch for the television set that can be locked in an off condition when parents do not wish to have their children viewing television. The above control methods have proved unsatisfactory because they do not permit the children to do any television viewing unless their parents are present and there are many educational programs during the early afternoon that children of working parents would miss.

The present invention provides a television viewing control device that selectively controls the viwing time of viewers watching the controlled television set to permit them to watch a predetermined amount of television at selective times during a day and to turn the television set to an off condition once such amount has been exceeded.

SUMMARY OF THE INVENTION

The present invention provides a television viewing control device for selectively controlling the viewing time of a selected number of viewers by limiting their viewing time to a predetermined maximum. The device operates on the basis that an individual password is assigned to each of the persons that may watch the controlled television set and this password must be fed into the device whenever one of the persons begins watching the controlled set. The device is programmed with a specific time limit assigned to each password and when the viewing time of one of the viewers watching the set is exceeded, the device automatically turns the control set to an off condition.

The device includes a first memory circuit means for semipermanently storing the assigned individual passwords for each of the viewers and a predetermined viewing time associated with each of the passwords, processing means including data storage means having the capacity for temporarily storing the individual password of each of the viewers watching the controlled set at any particular instance of time, and polling means operated at predetermined intervals of time to compare the passwords in the data storage means and the first memory circuit means and to subtract a period of time equal to said predetermined interval from the viewing time associated with each of said passwords in said data storage means and to actuate a control means to turn the controlled television set off when any one of the time limits reaches zero. The processing means turns the television set on and is controlled by a programed memory means that directs the operation of the polling means in response to the input of one of the passwords to said data storage means.

In a preferred embodiment, a time range is also assigned to each of said password codes in order to limit the viewing time of the viewer assigned such password code to specific hours during the day to prevent persons such as children from being able to operate the controlled set when programs undesirable for children are being shown.

DESCRIPTION OF THE DRAWINGS

FIG. 1 is a front perspective view of a preferred embodiment of the television control device of the present invention;

FIG. 2 is a rear perspective view of the device of FIG. 1 with a rear back wall of the housing thereof broken away to show interior construction.

FIG. 4 is an enlarged detailed front view in elevation of the front panel of the device of FIG. 1 with legends added; and FIG. 5 is an enlarged view of a panel control inside the housing of the device of FIG. 1 with legends added.

DESCRIPTION OF THE PREFERRED EMBODIMENT

Figure 3:
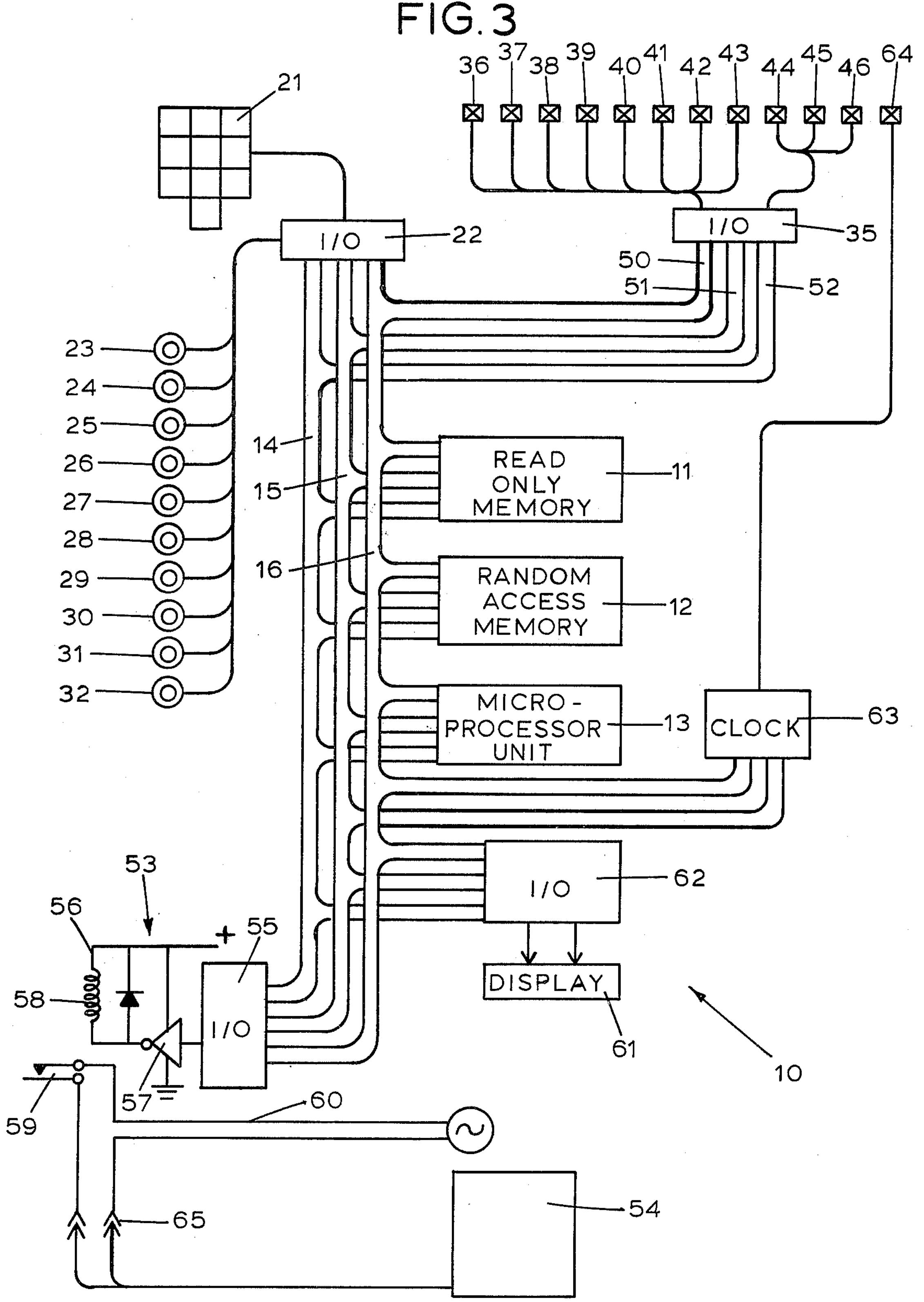
FIG. 3 is a block diagram of the electrical circuitry of the device of FIG. 1.

Referring now to the drawings, a preferred embodiment of the television control device of the present invention is shown in FIG. 1 at 1. The control device 1 preferably is adapted to selectively control the amount of television viewing time of children and the particular hours during which the viewing may be permitted in order to provide parents, especially those that often must leave their children home by themselves, control over the television viewing habits of their children. The operation of the control device 1 is based upon an assignment of an individual password code to each of the children of a family and also a specific maximum amount of television time and the daily time range during which such viewing can be conducted. A parent may then program the control device 1, with specific password codes, time limits, and time ranges as desired.

The device 1 essentially serves as an on and off switch for a controlled television set (not shown in FIG. 1), the operation of which is turned to an on condition by a prospective viewer entering their password into the device 1 via a front control panel 2. At such time, the device 1 will activate the controlled set if the viewer's viewing time limit has not been exceeded and the viewer is within his assigned daily time range. The television set will then remain in an on condition until the viewer signs off from the device 1 or the viewer's time limit is exceeded, at which point the device 1 will automatically turn the controlled set to an off condition.

Referring now to FIG. 2, the control device 1 includes a housing 3 with a hinged back wall 4 that may be locked in a closed condition to seal off the interior of the housing 3. A panel 5 is disposed within the interior of the housing 3 and includes switches for programming the device 1 with the individual password codes and associated time limits and time ranges.

The device 1 also includes a circuit board (not shown) on which electrical circuitry is contained. Referring to FIG. 3, an electrical block diagram of the circuitry of the device 1 is shown at 10. The circuitry 10 includes three major circuit components comprising a read only memory (ROM) 11, a random access memory (RAM) 12 and a micro processor unit (MPU) 13 that are electrically tied to one another by an address bus 14, a data bus 15 and a control bus 16. The ROM 11, RAM 12 and MPU 13 are all standard off the shelf components that may be purchased in the marketplace from various manufacturers such as Motorola Semiconductor Products, Inc. which has a MC 68341 ROM, a MC 68340 RAM, and a MC 68000 MPU.

The ROM 11 is preprogrammed at the factory to contain the program sequences that provides the various functions of the control device 1 and instructs the MPU 13 to carry out its several computation functions involved therein. The ROM 11 and RAM 12 should be non-volatile so that their programs will not be erased when an interruption of the power supply for the device 1 is experienced.

The RAM 12 serves as a first memory circuit for semipermanently storing each assigned individual password code for each child of a family and a predetermined viewing time and time range associated with each of the password codes. Thus, the RAM 12 is that component of the circuit 10 that is programmed by a parent to provide a specific time limit and time range for each child.

A numeric keyboard 21 of standard construction is employed for supplying information to the RAM 12 and the MPU 13. The keyboard 21 is series connected to a first input/output (I/O) interface 22 which provides temporary storage of information from the keyboard 21 and also acts as a translator between the keyboard 21 and the computer language of the RAM 12 and MPU 13. The I/O interface 22 is also connected in series with a plurality of parallel connected push-button switches located on the front control panel 2 and comprising an enter switch 23, a sign-on switch 24, a sign-off switch 25, a security switch 26, an inquiry switch 27, a time left switch 28, a time limit switch 29, a time range switch 30, a time switch 31, and a two position on/off switch 32. The switches 23–31 are of standard pushbutton construction, as indicated in FIG. 4, to provide a temporary closed circuit when they are pushed in and will automatically return to an open condition when released. Together the keyboard 21, I/O interface 22 and the switches 23–32 serve as a first information input branch for the circuitry 10.

To provide a password code programming capability for the device 1, there is a second information input branch comprising a second I/O interface 35 and a plurality of password switches 36–46 mounted on the interior panel 5 so as to be inaccessible whenever the back cover of the device 1 is locked in place. The switches 36–46 include eight password code program switches 36–43, a program switch 44, a time limit switch 45 and a time range switch 46. As shown in FIG. 5, each of the switches 36–36 is a two position switch with switches 36–44 having "set" positions 36*a*–43*a* respectively and "modify" positions 36*b*–43*b*, the program switch 44 having a "run" position 44*a* and a program position 44*b*, the time limit switch 45 having a "weekly" position 45*a* and a "daily" position 45*b* and the time range switch 46 having a "set" position 46*a* and a "modify" position 46*b*. Referring again to FIG. 3, the switches 36–46 all form separate parallel branches with one another that are in series relation to the I/O interface 35 for supplying control data thereto depending upon the position in which they are set. The I/O interface 35 is electrically connected to the ROM 11, RAM 12, and MPU 13 via a control bus 50, a data bus 51, and an address bus 52 which feed into the busses 16, 15 and 14, respectively.

A television control means 53 is actuated by the MPU 13 to in turn actuate a controlled television set 54 to an "on" condition or to an "off" condition. The control means 53 is formed of a third I/O interface 55 that is connected to the ROM 11, RAM 12, and MPU 13 by the electrical busses 14 through 16 and serves as a translator for a relay circuit 56. Included in the circuit 56 is an amplifier 57 that feeds signals to a relay coil 58 for operating relay switch 59. Opening or closing of the switch 59 provides an open or closed power circuit 60 for the television set 54 respectively.

To provide a means for checking various information in the RAM 12 and MPU 13, the control device 10 includes an eight digit display 61 operated through a fourth I/O interface 62 and connected to the electrical busses 14 through 16. The control device 1 also includes an internal clock 63 to provide internal timing for the MPU 13 and also to keep track of actual physical time in order to maintain the integrity of time ranges assigned to the particular passwords.

Referring again to FIG. 5, mounted on the panel 5 located in the interior of the housing 3 are the switches 36–46 and also a clock program switch 64 for setting the time of the clock 63. The switch 64 is a two position switch having a normal "set" position 64*a* and a "modify" position 64*b*. To set the clock 63 merely requires actuation of the switch 64 from the "set" position 64*a* to the "modify" position 64*b* which enables the clock 63 (FIG. 3) to receive a time adjustment. The correct time is then typed on the keyboard 21 in military time, such as 2250, and is stored in the memory of the I/O interface 22 until the enter button 23 is pushed. Thereupon, the correct time is supplied to the clock 63.

In addition to the above switches, the panel 5 (FIG. 2) has a recessed electrical outlet 65 in which an electrical power cord of the controlled television set 54 may be plugged. Thus, when the hinged back wall 4 is locked in position, the switches 36–46 and the outlet 65 for the television set power cord are inaccessible to those not having a key for unlocking the back wall 4.

To program the control device 1 with the appropriate password codes and their associated time limits and time ranges, the following procedure is employed. The control device 1 includes the requisite circuitry for handling codes for eight different passwords, each of which is represented by switches 36–43. The procedure for programming each password code is essentially identical and, therefore, only the procedure for programming password code No. 1 will now be described.

To begin programming of password code No. 1, The two position password switch 36 is actuated from its normal "set" position 36*a* to its modify position 36*b*, the program switch 44 is actuated from its normal "run" position 44*a* to the program position 44*b*, the time limit switch 45 is set on either its "daily" or "weekly" position 45*b* or 45*a* respectively depending on the particular type of time limit desired to be associated with password code No. 1, and the time range switch 46 is set on its "set" position 46*a*. Through the actuation of the switches 36, 44, 45 and 46 in the above described manner, control signals are fed to the I/O interface 35 to ready the RAM 12 for receipt of data in the appropriate storage area for password No. 1.

Next, a first eight digit code is typed on the keyboard 21 and is stored in the I/O interface 22. The first four digits of this first eight digit code form a four digit password code assigned to password No. 1, and the second four digits of such code identify the time limit in minutes assigned to password No. 1. Once the first eight digit code is in the storage of I/O interface 22, the enter push-button 23 is then pressed to direct the I/O interface 22 to supply the first code to the memory storage of the RAM 12, thus completing the first half of the programming of password No. 1.

To begin the second half of the programming for password code No. 1, the time range switch 46 is actuated from its normal "set" position 46*a* to the modify position 46*b* to direct the RAM 12 through the I/O interface 35 to be ready to receive time range data in the appropriate storage memory for password code No. 1. A second eight digit code is then typed on the keyboard 21 to again be stored in the I/O interface 22. Thereupon, the enter push-button 23 is again pressed to supply the second code from the I/O interface 22 to the appropriate storage area in RAM 12 for the time range of password code No. 1. The first four digits of the second eight digit code represents the beginning time of the time range assigned to password code No. 1 in military time such as 0800, and the second four digits of such code represent the ending time of the range such as 2200.

This then completes the programming for password No. 1 and the remaining passwords 2–8 can similarly be programmed into the RAM 12. The password codes 1–8 may be programmed sequentially from one through 8 but this is not essential as the password code to be programmed is determined by actuation of the password switches 36–43 depending on which of such switches have been actuated from the normal "set" position to their "program modify" position.

Upon the assignment of the appropriate password code with its associated time limit and time range for each of the individuals desired to be assigned a password, the control device 10 is ready to begin controlling the viewing time of the controlled television set 54. Thereafter, to actuate the television set 54 to an "on" position, the following procedure must be employed.

First, the on/off switch 32 is actuated to an "on" position by one desiring to view the television set 54. Next, the viewer presses the "sign on" push button 24 to feed an electrical signal through the I/O interface 22 to the ROM 11 and the RAM 12 to place them in an active condition and also to the memory storage of the MPU 13 actuating same for receipt of information. The viewer then types his or her four digit password code on the numeric keyboard 21 for the storage of same in the I/O interface 22, but the password will not display on the display 61. The enter button 23 is then pressed to transmit this four digit password code to the appropriate storage area in the MUP 13. Upon activation by the "sign on" signal, the ROM 11 controls the operation of the MPU 13 in conformance with its permanent programming to instruct the MPU 13 to compare each password code with the password code stored in the RAM 12.

When the television set is in an "off" condition and a first password code is typed into the MPU 13, the ROM 11 directs the MPU 13 to interrogate the RAM 12 to determine if there is a match of the typed in password code with one of the password codes stored in the RAM 12. If such a match is found, and the associated time limit with such password code is greater than zero the MPU 13 will supply a signal to the I/O interface 54 to actuate the relay 57 thereby completing the electrical circuitry for the television set 54 and actuate it to an "on" condition. Of course, if there is no matching password code found by the MPU 13 in the RAM 12, the television set 54 will remain in an "off" condition. This could occur through the viewer typing in an incorrect password code. When the MPU 13 finds no matching password code for the incorrect typed-in password code, the ROM directs the MPU 13 to supply an error signal to the I/O interface 62 to indicate by way of display on the eight digit display 61, that an error has occurred so that the viewer can then repeat the "sign-on" procedure. It is also possible that the viewer signing on may have used his maximum viewing time prior to "sign-on". In that event, the ROM 12 is programmed to direct the MPU 13 to provide a signal to the I/O interface 62 showing an expired time legend on the display 61.

Each viewer that desires to view the television set 54 must sign on by using the same procedure as described above to feed their password codes into the MPU 13. Once the television set 54 is in an "on" condition the ROM 11 is programmed to direct the MPU 13 to compare the password codes in the MPU 13 to those stored in the RAM 12 and the time limits associated therewith on, preferably, on a minute-by-minute basis and to subtract a minute from each of the time limits associated with the password codes contained in the MPU 13 to keep track of the viewing time of the viewers watching the set 54.

When a viewer desires to cease watching the television set 54, he or she must "sign off" from the control device 1. This is accomplished by pressing the "sign off" push button 25, typing in his or her password code on the keyboard 21 to enter the password code on the I/O interface 22 and then pressing the enter button 23 to remove his or her password code from the memory storage in the MPU 13. However, to facilitate a mass simultaneous sign off procedure for all the viewers when desired, the "on/off" switch 32 may be used. Thus, by simply pressing the "on/off" switch 32, a "sign off" signal is sent through the I/O interface 22 to the ROM 11, which in turn directs the MPU 13 to supply a signal to the I/O interface 55 to deactivate the relay 56 and thereby break the power circuit for the controlled television set 54. The ROM 11 then supplies a turn-off signal to the RAM 12 and the MPU 13 and returns to a standby condition.

When there are a number of viewers watching the television set 54, the expiration of the time limit for any one of the viewers will cause the television set 54 to be turned "off". This occurs when the MPU 13 in making its minute-by-minute comparison determines that one or more of the password codes stored in its memory has an expired time limit associated therewith. The MPU 13 is then directed by the ROM 11 to supply a turn-off signal to the I/O interface 55 and the ROM 11, RAM 12 and MPU 13 return to a standby "off" condition as previously described. Simultaneously the MPU 13 preferably will also provide an electrical signal to the I/O interface 62 to display the number of the password code of the viewer with the expired time, such as password code No. 4 out of password codes 1–8.

It should be noted that turning the control device from an on condition to an off condition does not erase the information stored in the RAM 12. Accordingly, as the viewing time associated with the password codes 1–8 decreases during viewing, the RAM 12 maintains in its memory the original time limit and the time remaining for each password. During the programmed viewing period (daily or weekly), the time remaining for each password code begins decreasing when the viewer assigned the password signs on the control device and continues decreasing during viewing until either the time remaining reaches zero or the end of the assigned viewing period occurs. When the time remaining reaches zero, the television set is deactivated, as described above. But when the assigned viewing period terminates, the ROM 11 directs the RAM 12 the reset by restoring each of the original time limits for the password codes 1–8. For example, if a viewer's time period is on a daily basis and is 120 minutes long, the viewer's time limit will return to 120 minutes at the end of each day.

The circuitry described above is essentially the heart of the control device 1, but to facilitate the operation of the control device 1, the ROM 11 is programmed with additional functions which are "security," and "inquiry," time range and "time."

A security function permits one to interrogate the control device 1 as to the number of viewers having their password codes in the MPU 13. This is accomplished by pressing the security button 26 to activate the ROM 11 through the I/O interface 22, which in turn directs the MPU 13 to sequentially supply electrical signals to the I/O interface 62 representative of the number of the password codes then contained in its memory storage and exactly which of the password codes are contained therein such as password code Nos. 1, 3 and 5. This information then is shown on the eight-digit display 61.

The inquiry function permits one to interrogate the control device 1 as to the amount of time left or the time limit associated with the particular password code. This is accomplished by sequentially pressing the inquiry button 27 and the time left button 28 or the time limit button 29 depending upon which time is desired, typing the password code in question on the keyboared 21 and then pressing the enter button 23. Following this sequence of action, the ROM 11 will direct the MPU 13 to interrogate the RAM 12 to determine the particular time desired and then will supply electrical signals to the I/O interface 62 to display the appropriate time on the display 61.

The time range and time function are simply for informational purposes to provide the time range of a particular password code and the actual time of day respectively.

Thus, the control device 1 provides an efficient means for monitoring the viewing time of those viewers watching the controlled set 54 to insure that each viewer does not exceed the amount of their allotted viewing time.

Although the device 1 is described herein as being separate and apart from the controlled television set 54, that is not essential and instead, the device 1 could be produced by manufacturers of television sets as an internal component of such sets.

I claim:

1. A television viewing control device for recording the viewing time of a plurality of viewers watching a controlled television set, and turning said set off when a predetermined viewing time limit of any one of said viewers is exceeded, said control device comprising:

(a) a memory circuit means having the capacity for semipermanently storing an assigned individual password for each of said viewers and a predetermined viewing time associated with each of said passwords;

(b) control means for turning said controlled television set on and off;

(c) processing means including:

(1) data storage means having the capacity for temporarily storing the individual password of each of said viewers watching said controlled set, and (2) polling means operated at predetermined intervals of time to compare the passwords in said data storage means and said memory circuit means and to subtract a period of time equal to said predetermined interval from the viewing time associated with each of said passwords in said data storage means;

(d) a first means to actuate said control means to turn said television set off when any one of said time limits associated with said passwords reaches zero;

(e) programming means for supplying said assigned passwords and said associated time limits to said memory circuit means, (f) input means for use by each of said viewers to feed their assigned password to said data storage means when said viewers desire to view said television set;

(g) a programmed memory means to direct the operation of said polling means in response to the input of one of said passwords to said data storage means;

(h) a second means to actuate said control means to turn said controlled set to an on condition in response to the input of at least one of said passwords to said data storage means; and (i) clock means for providing internal timing for said polling means.

2. A television viewing control device as recited in claim 1 wherein said device further includes display means operable by the processing means to display information provided thereby.

3. A television viewing control device as recited in claim 1 wherein said memory circuit means has the additional capacity for semi-permanently storing a predetermined viewing time range associated with each of said assigned individual passwords.

4. A television viewing control device as recited in claim 1 wherein said device further includes security means to permit one to ascertain the number of passwords contained in the data storage means of said processing means at any particular instance of time.

5. A television viewing control device as recited in claim 1 wherein said device further includes inquiry means to permit one to ascertain the time remaining associated with each of said passwords in the memory circuit means or to ascertain the original time limit associated with each of said passwords.

6. A television viewing control device as recited in claim 1 wherein said control device includes a second inquiry means for interrogating the control device as to the particular time range associated with each of said passwords contained in said first memory circuit means.

7. A television viewing control device for recording the viewing time of a plurality of viewers watching a controlled television set, and turning said set off when a predetermined viewing time limit of any one of said viewers is exceeded, said control device comprising:

(a) a memory circuit means having the capacity for semi-permanently storing an assigned individual password for each of said viewers and a predetermined viewing time associated with each of said passwords;

(b) processing means including:

(1) data storage means having the capacity for temporarily storing the individual password of each of said viewers watching said controlled set, and (2) polling means to compare the passwords in said data storage means and said memory circuit means and to subtract time from the viewing time associated with each of said passwords in said data storage means;

(c) a first means to provide a signal when any one of said time limits associated with said passwords reaches zero;

(d) programming means for supplying said assigned passwords and said associated time limits to said memory circuit means, (e) input means for use by each of said viewers to feed their assigned password to said data storage means when said viewers desire to view said television set; and (f) a programmed memory means to direct the operation of said polling means in response to the input of one of said passwords to said data storage means.

* * * * *